(12) United States Patent
Newton et al.

(10) Patent No.: US 7,141,284 B2
(45) Date of Patent: Nov. 28, 2006

(54) DRYWALL TAPE AND JOINT

(75) Inventors: Mark Joseph Newton, Ontario (CA); David Geraint Roberts, Youngstown, NY (US)

(73) Assignee: Saint-Gobain Technical Fabrics Canada, Ltd., Ontario (CA)

( * ) Notice: Subject to any disclaimer, the term of this patent is extended or adjusted under 35 U.S.C. 154(b) by 58 days.

(21) Appl. No.: 10/102,061

(22) Filed: Mar. 20, 2002

(65) Prior Publication Data

US 2003/0181114 A1  Sep. 25, 2003

(51) Int. Cl.
  *B32B 9/00* (2006.01)
  *B32B 33/00* (2006.01)
  *B32B 7/12* (2006.01)
(52) U.S. Cl. .................... 428/40.1; 428/40.5; 428/343
(58) Field of Classification Search ............... 428/40.1, 428/40.4, 40.5, 343
  See application file for complete search history.

(56) References Cited

U.S. PATENT DOCUMENTS

| | | | |
|---|---|---|---|
| 3,391,037 A | 7/1968 | McNulty | 156/71 |
| 3,671,372 A | 6/1972 | Hoffman | 161/58 |
| 4,015,994 A | 4/1977 | Hill | 106/99 |
| 4,039,492 A * | 8/1977 | Hamilton | 524/26 |
| 4,042,739 A * | 8/1977 | Emal et al. | 428/137 |
| 4,102,338 A * | 7/1978 | Parker | 602/8 |
| 4,105,824 A | 8/1978 | Monte | 428/355 |
| 4,115,135 A | 9/1978 | Goeman | 106/99 |
| 4,123,287 A | 10/1978 | Cockram | 106/99 |
| 4,140,533 A | 2/1979 | Ohtomo et al. | 106/50 |
| 4,188,454 A | 2/1980 | Foley et al. | 428/391 |
| 4,228,208 A | 10/1980 | Smith et al. | 428/95 |
| 4,272,294 A | 6/1981 | Jaunarajs | 106/99 |
| 4,288,962 A | 9/1981 | Kavanaugh | 52/743 |
| 4,313,991 A * | 2/1982 | Lamb | 428/131 |
| 4,341,835 A | 7/1982 | MacDowell | 428/292 |
| 4,355,128 A | 10/1982 | Mercer | 524/423 |
| 4,454,267 A | 6/1984 | Williams | 524/43 |
| 4,657,594 A | 4/1987 | Struss | 106/308 N |
| 4,686,253 A | 8/1987 | Struss et al. | 524/44 |
| 4,776,865 A | 10/1988 | Allaire | 65/3.2 |
| 4,830,989 A | 5/1989 | Trivedi et al. | 501/35 |
| 4,940,047 A * | 7/1990 | Richter et al. | 602/6 |
| 5,075,358 A | 12/1991 | Riley et al. | 524/5 |
| 5,090,405 A * | 2/1992 | Jansen et al. | 602/8 |
| 5,110,656 A | 5/1992 | Inaba et al. | 428/257 |
| 5,218,810 A | 6/1993 | Isley, Jr. | 52/725 |
| 5,225,237 A | 7/1993 | Magnani | 428/227 |

(Continued)

FOREIGN PATENT DOCUMENTS

DE      92 06931.2      9/1992

(Continued)

OTHER PUBLICATIONS

Joint Tapes for Industrialized Construction, United States Gypsum Company, 1999.*

(Continued)

*Primary Examiner*—Harold Pyon
*Assistant Examiner*—Patricia L. Nordmeyer
(74) *Attorney, Agent, or Firm*—Duane Morris LLP

(57) ABSTRACT

Drywall tapes, drywall joints and methods for their construction are provided by this invention. The drywall tape of this invention includes a web of glass fibers and a coating disposed over a portion of the glass fibers. The coating includes a resinous binder which is at least partially soluble or dispersible in joint compound. The resinous binder is capable of forming an adhesive bond with the joint compound when set.

26 Claims, 2 Drawing Sheets

U.S. PATENT DOCUMENTS

| | | | |
|---|---|---|---|
| 5,308,692 A | 5/1994 | Kennedy et al. | |
| 5,486,394 A | 1/1996 | Stough | 428/61 |
| 5,607,527 A | 3/1997 | Isley, Jr. | 156/71 |
| 5,647,180 A | 7/1997 | Billings et al. | 52/454 |
| 5,653,797 A | 8/1997 | Patel | 106/781 |
| 5,687,523 A | 11/1997 | Stough | 52/417 |
| 5,736,246 A | 4/1998 | Augier et al. | 428/392 |
| 5,763,043 A | 6/1998 | Porter et al. | 428/109 |
| 5,916,361 A | 6/1999 | Molloy et al. | 106/696 |
| 5,981,406 A * | 11/1999 | Randall | 442/71 |
| 6,017,588 A | 1/2000 | Watanabe et al. | 427/407.1 |
| 6,054,205 A | 4/2000 | Newman et al. | |
| 6,071,833 A * | 6/2000 | D'Alisa et al. | 442/42 |
| 6,123,485 A | 9/2000 | Mirmiran et al. | 405/252 |
| 6,123,879 A | 9/2000 | Hendrix et al. | 264/31 |
| 6,183,835 B1 | 2/2001 | Cho et al. | |
| 6,219,988 B1 | 4/2001 | Mahfouz et al. | 52/721.4 |
| 6,219,991 B1 | 4/2001 | Salek-Nejad | 52/741.3 |
| 6,237,292 B1 | 5/2001 | Hegemier et al. | 52/273 |
| 6,254,817 B1 | 7/2001 | Cooper et al. | 264/171.13 |
| 6,261,360 B1 | 7/2001 | Dry | 106/677 |
| 6,263,629 B1 | 7/2001 | Brown, Jr. | 52/309.16 |
| 6,265,056 B1 | 7/2001 | Rieder et al. | 428/294.7 |
| 6,315,499 B1 | 11/2001 | Kittson | 405/258.1 |
| 6,324,805 B1 | 12/2001 | Naniwa | 52/431 |
| 6,330,776 B1 | 12/2001 | Jinno et al. | 52/649.1 |
| 6,332,992 B1 | 12/2001 | Chatelain | 264/69 |
| 6,340,522 B1 | 1/2002 | Burke et al. | 428/359 |
| 6,344,081 B1 | 2/2002 | Pelot et al. | 106/711 |
| 6,391,131 B1 | 5/2002 | Newman et al. | 156/39 |
| 6,436,185 B1 | 8/2002 | Ayambem et al. | 106/793 |
| 2001/0036996 A1* | 11/2001 | Bristol et al. | 524/841 |
| 2001/0047844 A1 | 12/2001 | Edwards et al. | 156/91 |
| 2001/0049399 A1 | 12/2001 | Edwards et al. | 521/101 |
| 2004/0074184 A1 | 4/2004 | Naji | |

FOREIGN PATENT DOCUMENTS

| | | |
|---|---|---|
| EP | 0 106 986 A2 | 2/1984 |
| EP | 0 732 464 A1 | 9/1996 |
| EP | 1 092 693 A2 | 4/2001 |
| EP | 1 170 440 A1 | 1/2002 |
| EP | 1 172 343 A1 | 1/2002 |
| FR | 71.39963 | 11/1971 |
| FR | 2 514 806 | 10/1982 |
| FR | 2 808 795 A1 | 11/2001 |
| FR | 2 810 661 A1 | 12/2001 |
| JP | 58 060643 | 4/1983 |
| JP | 06 323682 | 6/1996 |
| JP | 10152361 A | 6/1998 |
| JP | 2002/88614 | 3/2002 |
| JP | 2003-253891 | 10/2003 |
| WO | WO 97/42444 | 11/1997 |
| WO | WO 01/32341 A1 | 5/2001 |
| WO | WO 01/92180 A1 | 12/2001 |
| WO | WO 02/00566 A1 | 1/2002 |
| WO | WO 02/02853 | 1/2002 |
| WO | WO 02/42064 A1 | 5/2002 |

OTHER PUBLICATIONS

Manufactured Housing Handbook, United States Gypsum Company, 1998.*
Products for Industrialized Construction, United States Gypsum Company, 2000.*
Material Safety Data Sheet, IMPERIAL Brand Tape, Oct. 1, 1999.*
Abuse-Resistant Systems, United States Gypsum Company SA929, pp. 1-12.
Plaster Systems, United States Gypsum Company, SA920, pp. 5 pages.
USG Sheetrock Joint Tape, United States Gypsum Company, 2 pages.
Reinforcing Tapes, 2 pages.
Warren et al., Decision on Appeal No. 2003-1901, Mar. 9, 2004, pp. 1-10. US Patent and Trademark Office.
International Search Report dated Jan. 15, 2004.
Bischoff, Textile Reinforced Concrete Facade Elements-An Investigation to Optimize Concrete Composite Technologies, 43rd International SAMPE Symposium and Exhibition (Proceedings) May 31-Jun. 4, 1998, vol. 43 n. 2 1998, 1790-1802.
Perez-Pena, et al., Mechanical Properties of Fiber Reinforced Lightweight Concrete Composites, Cement and Concrete Research, vol. 24, No. 6, pp. 1121-1132, 1994.
Jones, John, Glass Fibers for Exceptional Product Properties, Inorganic-Bonded Wood and Fiber Composite Materials, vol. 7 2000.
Hegger, et al., New Composite Material Textile-Reinforced Concrete, Bentonwerk Fertigteil Tech, vol. 68, No. 2, pp. 22-24, Feb. 26, 2002.
Nakagawa, et al., Fiber reinforced concrete: developments and applications to buildings, Advanced Composite Materials, vol. 3., No. 2, pp. 123-131 (1993).
Grimer, et al., The strengths of cements reinforced with glass fibres, Magazine of Concrete Research vol. 21 in 66, pp. 23-30, Mar. 1969.
Muller, et al., Recent Developments in Glass Fibre Reinforced Cement, Vetrotex Cem-FIL, Spain.
FYFE Co. LLC, Tyfo® Fabricated Composite Systems for New Construction and Retrofits.
MBRACE® Composite (FRP) Strengthening Systems., Systems to Extend the Life of Concrete, Masonry Timber and Steel Structures Reinforced with FRP based on Carbon and Aramid (KEVLAR®) fibres., Sep. 2000, Ref No. 0351.
Weber and Broutin United Kingdom, SBD Construction solutions, En-Force Composite Strengthening.
ICBO Evaluation Service, Inc., Acceptance Criteria for Concrete and Reinforced and Unreinforced Masonry Strengthening Using Fiber-Reinforced, Composite Systems, Apr. 1997.
Fyfe Co, LLC, Tyfo® Concrete Repair System.
Fyfe Co. LLC, TYFO® Systems for Unreinforced Masonry (URM) and Reinforced Concrete/Masonry Wall Strengthening.
Fyfe Co. LLC, TYFO® Fibrwrap to "Extend—The—Life" of Cracked and Spalled Concrete Members.
Fyfe Co. LLC, "The Fibrwrap Company" TYFO® CIS, Corrosion Inhibitors Type S.
Fyfe Co. LLC, "The Fibrwrap Company" TYFO® SW Fibrwrap® For Underwater Applications Using Both Glass and Carbon Fiber Reinforced TYFO® Materials, Combined with our Tyfo® Epoxy Matrices.
Fyfe Co. LLC, "The Fibrwrap® Company" TYFO® Fibrwrap® Systems for Blast Hardening and Mitigation.
Fyfe Co. LLC, "The Fibrwrap® Company" TYFO® Systems for Wood.
Fyfe Co. LLC, "The Fibrwrap® Company" TYFO® Fibrwrap® Systems for Chimneys, Stacks, and Tanks.
Fyfe Co. LLC, "The Fibrwrap® Company" TYFO® Systems for Beams and Slabs.
Fyfe Co. LLC, "The Fibrwrap® Company" TYFO® Fibrwrap® For Reinforced Concrete Columns.
Fyfe Co. LLC, "The Fibrwrap® Company" TYFO® Fire-Resistant Systems.
Fyfe Co. LLC, "The Fibrwrap® Company" TYFO® Viscoelastic Dampers.
Fyfe Co. LLC, "The Fibrwrap® Company" TYFO® UG Composite Laminate Strip System.
Hexcel® Civil Engineering and Construction Systems, Repair and Strengthening Solutions for the Construction Industry, Hex-3R.
Polyplast Strengthening System, Polyplast Strengthening Systems Ltd. Product Information.
Direct Roving for Weaving Input, Saint-Gobain Vetrotex.
Corradi, et al., Strengthening Techniques Tested on Masonry Structures Struck by the Umbria-Marche Earthquake of 1997-1998, Construction Building Materials, vol. 16, (2002) pp. 229-239.
Experimental Study On Woven Glass Fabrics for Cementitious Applications, GRC 2002, 12th International Glass Fibre Reinforced Concrete Congress, Dublin, Ireland, May 14-16, 2001.

* cited by examiner

DRYWALL TAPE AND JOINT

FIELD OF THE INVENTION

The present invention relates to drywall joining systems for seams or repairs generally, and more particularly to tape used for drywall installation and repairs.

BACKGROUND OF THE INVENTION

Walls made from gypsum wall board or drywall are conventionally constructed by affixing the boards to studs or joints and filling and coating the joints with a specially prepared adhesive called "joint compound." This process is also used to make repairs of defects, such as holes and dents, including those around electrical boxes, piping and duct work, as well as corners created by the intersection of drywall boards.

Drywall tape adds strength and crack resistance as well as smooth concealment at flat joints and inside corners. Conventionally, two types of drywall tape have been employed—a simple kraft paper strip which is adhered to the drywall surfaces by a bedding coat of joint compound or "mud," and glass fiber tape, which can be applied with joint compound or self-adhered. Kraft paper tape must be carefully positioned and care must be taken not to discharge the mud onto non-working surfaces. In addition, once the paper drywall tape has been applied, one must wait as much as a day for the compound to dry before a final surface coat of compound can be applied. Glass fiber tape, on the other hand, provides exceptional wet and dry strength and resists stretching and wrinkles. It can be laid flat and resists tearing under load.

A joint treatment system which includes reinforcing tape and joint compound, must provide joints as strong as the gypsum board itself. Otherwise, normal structural movement in the wall or ceiling assembly can result in the development of cracks over the finished joint.

It has been discovered that certain types of fiberglass leno-weave mesh tape when used with conventional joint compounds are more prone to cracking than joints finished with paper tape and conventional joint compounds. Because of this, some manufacturers, such as United States Gypsum Company, Chicago, Ill., have manufactured glass fiber tapes with cross-fiber construction to provide greater drywall joint strength than conventional fiberglass leno-weave mesh tapes. Such tapes include Sheetrock® brand fiberglass drywall tape and Imperial® brand tape. The Imperial® brand tape includes an open weave of glass fibers (100 meshes per square inch) which is coated with a binder and slit to roll width. Spirally woven (leno) long strands and the binder coating reduce edge raveling and fraying and keep the loose threads from defacing finishing surfaces.

Still another drywall tape that has been commercially accepted is Fibatape® glass tape available through San Gobain Technical Fabrics, Ontario, Canada. This product is an SBR rubber-coated glass fiber tape with a self-adhesive backing. The tape is self-adhered to a drywall seam, and then covered with layers of drywall compound. Samples of a drywall joint made with Fibatape® tape have been tensile tested in accordance with ASTM C 474 (Appendix) which measures the strength to first crack of a tape-compound sample coated in electrically conductive paint. The strength is measured until the first crack in the paint occurs, which breaks the electrical continuity along the surface and registers the ultimate tensile load. Failure in Fibatape® joint tape tensile specimens is observed at the SBR rubber film where the joint compound separates from the film at failure. This suggests that typical taped joints in glass tape-drywall systems do not optimize the strength of the glass-joint compound composite, since tensile loads tend to separate the glass fibers from the joint compound matrix instead of transferring these loads to the glass fibers themselves.

Accordingly, there is a need for creating a higher strength wall board joint composite system employing glass fiber tape. Such a system should be chemically compatible with ready mixed or powder joint compound compositions and should not substantially detract from the already established benefits of using glass fiber tape over kraft paper tape.

SUMMARY OF THE INVENTION

In a first embodiment of the present invention, a drywall tape suitable for joint compound repairs and joint covering is provided. The drywall tape includes a web of glass fibers and a coating disposed over a portion of the glass fibers. The coating comprises a resinous binder which is at least partially soluble or dispersible in the joint compound. The coating is further capable of forming an adhesive bond with the joint compound when set.

In the preferred embodiments, the joint compound and re-wettable coating "wet and set" together. The re-wettable coating can be chemically very similar to the binding resin that makes up the compound itself, or is at least soluble or dispersible in the joint compound. Most preferably, the re-wettable coating is soluble or dispersible in the water content of the joint compound so that it flows together with the compound on a microscopic scale. Once dry, the coating most preferably becomes a very rigid film that is well able to transfer loads from the joint compound to the fiber. This permits the joint compound and drywall tape of this invention to act much like a fully integrated composite, which increases the mechanical properties of the joint.

Tensile testing of joints made in accordance with this invention has revealed that the load to first crack can be increased by as much as 16 to 65% over SBR-coated Fibatape samples embedded in the same joint compound composition. Note that all samples were coated on one side with a pressure sensitive adhesive. Testing of plant production samples in accordance with ASTM C474 (appendix) revealed that leno weave fabrics benefitted most by the new coating, with a 65% improvement, followed by knit fabric (40%) and lastly, plain weaves (16 to 28%). When tapes without an adhesive backing are tested in accordance with ASTM C474, a similar percent increase in tensile load to failure can be attributed to the invention. However, the magnitude of the results will be about double that of the tapes that are adhesive backed. The explanation for this is that, in the case of the adhesive coated samples, half of the surface area of the glass web would be covered with a layer of low modulus pressure-sensitive material that does little to resist tensile loads placed on the sample.

While standard glass tape products typically fail due to the fiber pulling out from the joint compound, the drywall tape of this invention with the re-wettable coating has been shown to fail by delamination within the joint compound itself. Along with the increased load to tensile failure, delamination in the joint compound suggests that the bond between the coating and the compound is improved since the fibers in the sample do not pull out. The drywall tape of this invention also produces tensile strength results which are approximately twice those previously measured for paper tape, without adding anymore basis weight or fibers to the glass fabric, over that for a conventional glass tape, such as Fibatape® tape.

In further embodiments of this invention, the re-wettable coating comprises a soluble or dispersible resinous binder alone, or in combination with a blocking agent, such as a wax. A combination of a soluble binder, such as polyvinyl acetate (PVAc), and wax, offers a strong bond with the joint compound, while also minimizing "blocking" in the tape. The preferred re-wettable coating contains PVAc resin which is very hydroscopic. Water vapor absorption can cause a roll of tape made with PVAc resin to block or fuse together, which causes the roll to bind. The roll of tape can also flow plastically and deform the shape of the tape roll. Blocking agents, such as paraffin wax, make the PVAc-based coating vapor resistant. Only when contacted with liquid water, such as when the tape is applied to a wall and coated with joint compound, does the PVAc resin re-wet and become soluble.

In a further embodiment of this invention, a method is provided for preparing a drywall joint. The method includes disposing a pair of drywall boards in adjoining relationship to one another to form a seam region. Next, the drywall tape of this invention is disposed over the seam. This drywall tape includes a web of glass fibers having disposed thereon a resinous binder capable of re-wetting and setting when contacted with the joint compound. A first joint compound layer is applied over the drywall tape so as to re-wet the resinous binder. The first joint compound layer and re-wetted resinous binder on the tape are then dried to form an adhesive bond.

BRIEF DESCRIPTION OF THE DRAWINGS

The accompanying drawings illustrate preferred embodiments of the invention according to the practical application of the principles thereof, and in which.

DETAILED DESCRIPTION OF THE INVENTION

This invention provides drywall tape, drywall joints, methods of preparing drywall joints, and reinforcements for cementitious materials generally. It is understood that while the present invention is preferably related to drywall seam or repair constructions, the re-wettable coatings on the glass and other reinforcing fibrous webs provide practical solutions to reinforcing gypsum fiber board, gypsum wall board, glass-faced gypsum board, tilebacker boards, high impact gypsum wall board, and concrete board constructions. The re-wettable coatings of this invention can be useful with cementitious materials such as gypsum, portland cement, and combinations of these materials with fillers or aggregate, such as mortar, cement and concrete. This invention can be used to enhance the performance of existing self-adhesive drywall joint tapes and patches, or tapes and patches which do not have a pressure-sensitive adhesive on one side of their construction. The benefits of a re-wettable resinous binder are realized whether a pressure-sensitive adhesive is present on the web or not. As used herein, the term "drywall" includes wall board, fiberboard, glass-faced gypsum boards, and their equivalents. As used herein, the term "tape" means a strip of material that can be provided in roll form, which may, or may not, contain an adhesive backing layer.

Figure 1:
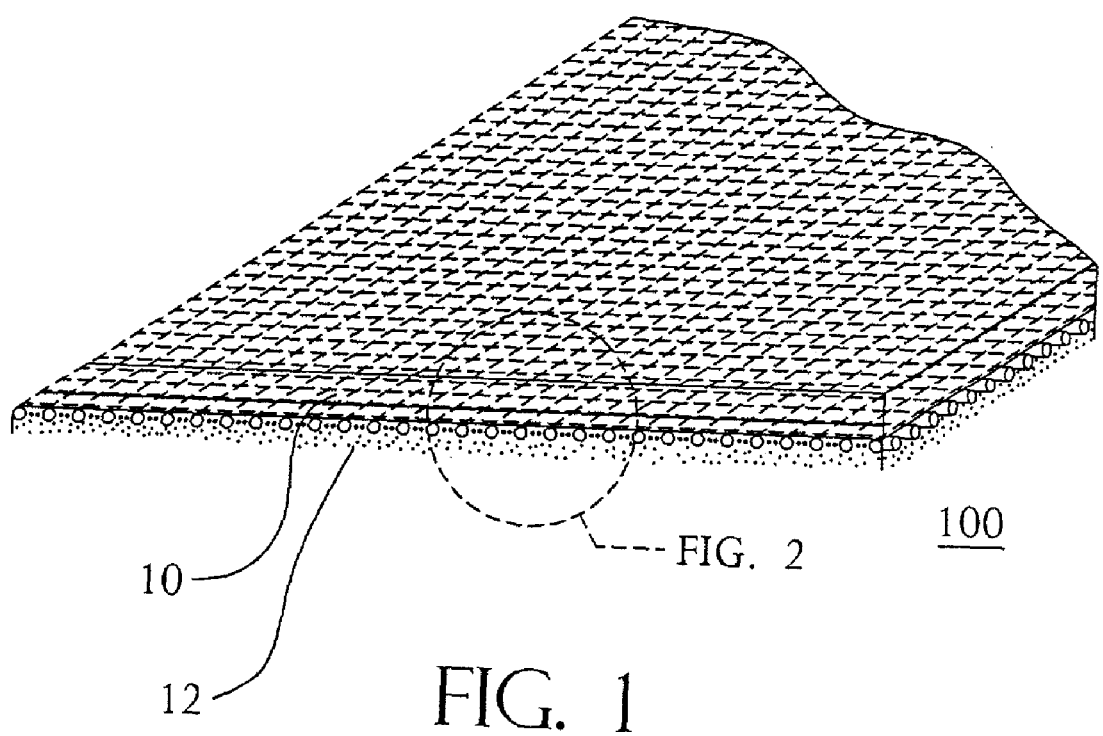
FIG. 1: is a partial, front perspective view of the preferred drywall tape of this invention.
Figure 2:
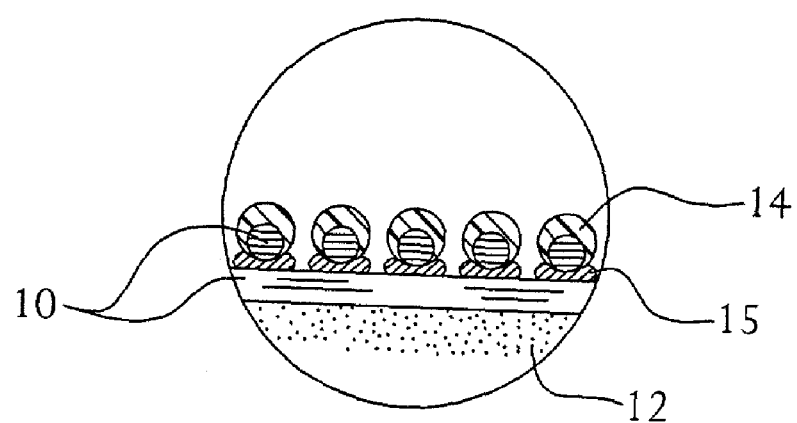
FIG. 2: is a partial, enlarged side-plan view, illustrating a coating on the drywall tape of FIG. 1.

With regard to the figures, and particularly to FIGS. 1–2 thereof, there is shown a preferred drywall tape 100 including a web of glass fibers 10 and an optional pressure-sensitive adhesive layer 12. When a portion of the drywall tape 100 is magnified, as shown in FIG. 2, the re-wettable coating 14 can be viewed. In the preferred embodiment of the drywall tape 100, the re-wettable coating 14 is disposed along one or both sides of the web of glass fibers 10. Alternatively, the re-wettable coating 14 can be disposed over 100% of the exterior surfaces of the web of glass fibers 10, over 70% of the surface area, or over less than 50% of the surface area. In certain constructions, the glass fibers of the web of glass fibers 10 are bonded together using a web adhesive binder 15, such as vinyl acetate acrylic, styrene/acrylate, vinyl/acetate, acrylic, styrene acrylic, or copolymers and mixtures thereof, etc. In instances where a web adhesive binder 15 is employed, it may or may not be re-wettable, soluble or dispersible in liquid water. In the preferred embodiment, the re-wettable coating 14 is used to also bind the fibers of the web of glass fibers together.

Figure 3:
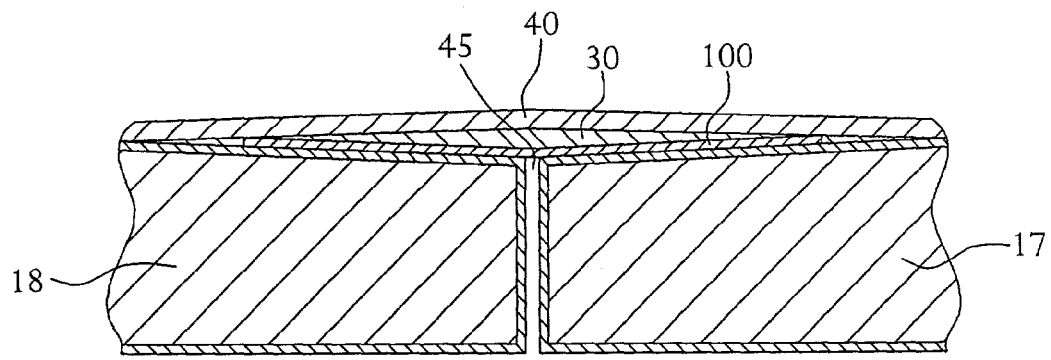
FIG. 3: is a partial, top, cross-sectional view of a finished flat drywall joint of this invention.

As shown in FIG. 3, a flat drywall joint can be constructed by butt joining a pair of drywall boards 18 and 17 to form a seam region 45. The drywall tape 100 can be applied with the aid of the pressure-sensitive adhesive layer 12, or when a pressure-sensitive adhesive is not employed, the drywall tape 100 can be pressed lightly into a wet joint compound layer which is thinly applied to the seam region 45 prior to application of the drywall tape 100. If joint compound is used to adhere the drywall tape 100 to the seam region 45, care must be taken to provide sufficient joint compound under the tape to prevent blistering of the tape. While embedding the tape 100, excess joint compound should be removed from the edge.

Whether the tape 100 is applied with joint compound, or self-adhered, a first coat of joint compound 30 should applied over the tape so as to embed the tape 100 nearly completely. While embedding the tape 100, excess joint compound is removed from the edge. Added water can be included in the joint compound so as to thin it for easier application. Similar approaches can be provided for inside corners, outside corners, horizontal flat joints and hole and crack repairs, finished seams along electrical boxes and switches and seams around piping and duct work.

After the first coat 30 is allowed to dry, preferably overnight, a second coat 40 of drywall compound is applied over the first coat 30, ideally with an 8 inch knife, feathering slightly beyond the first coat. If further coats are desired, the second coat 40 is allowed to dry, and a third or finishing coat (not shown) can be applied with a 10 inch knife to the flat joints. The second coat 40 or third coat can be lightly sanded if necessary.

The joint compound useful in the drywall joints of this invention is typically classified as either a "drying" or "setting" type. In a drying-type joint compound, the filler comprises substantially calcium carbonate. Prior to use, the filler and the binder, along with several other known ingredients, are mixed with water. After application, when the water drys to evaporation, a dry, relatively hard cementitious material is left behind.

Joint compositions known as the "setting" type include at least a substantial portion of calcium sulfate hemihydrate. In order to produce calcined gypsum, one converts calcium sulfate dihydrate from raw gypsum to the hemihydrate state through a known process called calcination. This process removes 1½ molecules of water from the calcium sulfate dihydrate gypsum. The hemihydrate form of calcium sulfate is substantially more soluble in water than the dihydrate form of calcium sulfate. During use of a setting-type joint compound, the calcium sulfate hemihydrate is rehydrated to the dihydrate state. This rehydration process normally takes place over a fairly short period of time. Accordingly, it is extremely difficult to produce a setting-type joint compound for storage in a bucket, and as such, such compounds are typically provided in powder form. Setting-type joint compounds also form a crystalline network upon setting, and provide a stronger, more durable bond.

The webs useful in manufacturing the drywall tape 100 of this invention can be provided as non-woven, woven or knitted fabrics, veils, mats, scrims, or fleece. They desirably include high strength fibers, such as glass fiber, and less desirably may include thermoplastic or thermosetting fibers, carbon, boron, graphite fibers or combinations thereof. In most examples of this invention, a web of glass fibers 10 having a basis weight of about 5–500 grams/m$^2$, preferably about 20–120 grams/m$^2$, is employed. This web 10 can be fabricated by weaving, such as a plane or leno weave, by knitting, by a laid scrim process or by a non-woven process, such as resin bonding randomly oriented glass fibers. The webs of this invention are, desirably, at least partially porous to wet joint compound so as to form a good bond in the seam region 45. Alternatively, a veil or fabric could be somewhat non-porous to joint compound and still be useful as a replacement for paper tape and, thus, be applied with a bedding coat of joint compound.

The preferred re-wettable coating 14 applied to the web desirably has the properties of being soluble or dispersible in liquid water. Glass tapes of the past were often coated with polymers, such as SBR rubber or a resinous binder, such as vinyl acetate acrylic, styrene/acrylate, vinyl/acetate, acrylic, styrene acrylic, etc., which were specifically designed to aid in handling and slitting the reinforcements without regard to how the coatings interacted with joint compounds. The adhesion of traditional rubber based coatings such as SBR to setting or non-setting joint compounds is minimal, and thus, an optimum composite strength cannot be achieved, e.g., the glass fibers tend to pull out from compound when loaded. The preferred re-wettable coatings 14 of this invention set to form a strong bond between the preferred glass fibers and the set joint compound so that the fibers act more as an unit to resist loads. The preferred re-wettable coating 14 of this invention should be as inexpensive as the styrene butadiene rubber (SBR) or joining resin binders currently employed on glass drywall tape. This coating 14 should be easy and versatile to formulate and should run on pad rolls with water clean up being highly desirable. It should not be significantly prone to oxidation or UV light degradation. Ideally, the preferred re-wettable coating 14 is provided in a latex form such as an aqueous emulsion of a binder resin, blocking agent and water.

The preferred re-wettable coating 14 of this invention contains one or more of the resins selected from the group including: polyvinyl acetate, ethylene vinyl acetate, polystyrene, polyvinyl chloride, polyacrylate, ethylene acetate co-polymer, vinyl-acrylic co-polymer, styrene butadiene, acrylic polymer and starch; protein glues, such as casein, soy protein, animal glue and gelatin; vegetable-based glues, such as cellulosics and their chemically modified derivatives; gums (polysaccharides and carbohydrates) such as guar gum; resins (pine tar) which may not be water soluble; mucilages (agar, carrageenan and algin); inorganics such as soluble silicates (water glass) and cementitious materials (cement, gypsum), and co-polymers and combinations of these. Most preferably, the resinous binder contains polyvinyl acetate (PVAc), such as Vinac 524 polyvinyl acetate homopolymer stabilized with polyvinyl alcohol, Airflex 401 polyvinyl acetate/ethylene co-polymer stabilized with polyvinyl alcohol, both supplied by Air Products and Chemicals, Inc., of 7201 Hamilton Blvd., Allentown, Pa. 18195. The re-wettable coating 14 preferably is provided in an aqueous emulsion or solution containing about 25–75 wt. % solids. Alternatively, water soluble polymers in powder form may be applied with adhesive or electrostatically. Two formulations of the re-wettable coating developed within the context of this invention are found below:

| Formulation 1 | |
|---|---|
| Vinac 524 Emulsion (PVAc homopolymer stabilized with polyvinyl alcohol) | 61.38% |
| Airflex 401 Emulsion (PVAc/ethylene co-polymer stabilized with polyvinyl alcohol | 26.30% |
| Water | 9.02% |
| Urea | 0.25% |
| Hydrocer DP69 (paraffin wax, anti-blocking agent) | 3.00% |
| 900-103 Henkel Foamaster NXZ mixed 50/50% with water. | 0.05% |
| Other pertinent formula data: | |
| Solids level: | 50% |
| Viscosity: | about 1000 cps |
| PH: | approximately 6.0 |

| Formulation 2 | |
|---|---|
| Vinac 524 Emulsion (PVAc homopolymer stabilized with polyvinyl alcohol) | 74.53% |
| Benzoflex 9-88 (dipropylene glycol dibenzoate plasticizer for PVAc) | 7.23% |
| Urea | 0.25% |
| Hydrocer DP69 (paraffin wax, anti-blocking agent) | 3.00% |
| Water | 14.94% |
| 900-103 Henkel Foamaster NXZ mixed 50/50% with water | 0.05% |

As reflected above, an important ingredient for preventing the PVAc resin from picking up too much water during storage is an anti-blocking agent, such as animal oils, fats, starch, dextrine, silicone oil, waxes and combinations thereof. The preferred anti-blocking agent is low melting point paraffin wax. The paraffin wax can be emulsified in the formulations and "blooms" to the surface when the formation is dried. The blocking agent acts as a vapor barrier to the re-wettable 14 coating on the drywall tape 100 of this invention, so as to substantially reduce blocking in tape rolls. The anti-blocking agent should be less than about 5–10% by weight of the formulation so that it can be dispersed readily when the re-wettable coating 14 is made soluble by the water in the joint compound. Accordingly, the re-wettable coating 14 with the above formulations containing an anti-blocking agent and PVAc resin in solution, is capable of being vapor resistant when dry, but is water soluble or dispersible when contacted with liquid water in the joint compound.

The adhesive elements of this invention can be made of any known pressure-sensitive adhesive material. As used herein, the term "pressure-sensitive" refers to any releasable adhesive or releasable tenacious means. Adhesive compositions suitable for tape include, for example, the water-based pressure-sensitive adhesive such as acrylate adhesives, e.g., isooctyl acrylate and acrylic acid copolymer, or vinyl acetate-2 ethyl hexyl acrylate copolymer which can be combined with tackifiers. Alternatively, the adhesive may comprise the rapid setting thermoplastic "hot melt" adhesives. The adhesive elements may also comprise a two-sided adhesive tape. It is also anticipated that adhesives based on an elastomer selected from natural or synthetic rubbers could be used. It will be understood that alternative shapes for these adhesives, for examples, continuous coatings, discontinuous lines, squares, dots, circles, etc., may be employed.

The preferred method of manufacturing the drywall tape 100 of this invention shall now be described. The glass fabric knitted web of 42.1–52.9 grams/m$^2$ is first passed through a bath of latex including the Formulations 1 or 2 and then through a set of squeeze rollers, which serve to control the amount of latex picked up by the fabric, usually about 5–20 grams/m$^2$ of coating when dry. The rollers could be adjusted for gap width or pressure to perform this function, but the solids level and the viscosity of the latex are important factors in determining the coating weight. The leno saturated fabric is then dried either by contact with steam cans or by convection in a hot oven.

At this point, the web of glass fibers 10, now coated with a re-wettable coating 14, is provided with a pressure sensitive adhesive layer 12 applied to one side, usually about 3–15 grams/m$^2$ of adhesive is applied. This may be done in a subsequent step on a separate finishing machine, or directly in line with the re-wettable coating step. The pressure-sensitive adhesive layer 12 serves to affix the drywall tape 100 to the drywall surface in preparation for drywall filling with drywall compound. Alternatively, the web of glass fibers 10 can be saturated and dried with the re-wettable coating 14, then within the same coating line, passed over a kiss coater that applies the desired amount of latex pressure-sensitive adhesive to the fabric. The fabric then passes into a mechanical convection oven for drying of the pressure-sensitive adhesive. In either case, the web 10 is then wound into large diameter rolls for transport to a slitting department where the roll can be processed into tapes of any desired length and width.

In still another variation of the manufacturing method, large rolls of glass or other fibrous fabric which have been saturated with the re-wettable coating 14 can then be taken to a separate machine called a hot-melt adhesive coater. The pressure-sensitive adhesive can be based on one of a number of hot-melt polymer technologies (such as those described above) rather than latex technology. The hot-melt coater applies a thin film of molten adhesive to one side of the fabric. The fabric is then formed onto a large roll for transport to the slitting area where it is processed into tapes of any desired length or width. The pressure sensitive adhesive performs the same function whether it is based on hot-melt or latex technology. Only the method of applying the adhesive differs in these two systems.

The large rolls produced in accordance with the above processes can be processed on slitter/rewinder machines for conversion into tape. The tapes may be of any geometry although most are approximately 50 mm wide by about 90 m long. The tapes are subsequently wrapped, packaged and sent to customers.

EXAMPLES

Tensile testing in accordance with ASTM C 474 (appendix) was conducted on assemblies of joint compound and the joint tape, employing the Formulations 1 and 2, to leno weave (46.3 grams/m$^2$), plain weave (47.5 grams/m$^2$) and knit fabric (52.9 grams/m$^2$). These were compared to control samples with SBR coating and a paper tape. Each tape sample was applied at the butt joint of two sanded polyethylene substrates. Joint compound is applied in two coats, and allowed to dry for a specified time. A conductive silver paint was applied to the testing area and connected in a series to form a circuit. The sample is then tested under tensile load on a tensile testing machine. When a crack appeared, the circuit failed, and the load is noted.

Tensile testing results revealed that the load to first crack could be significantly increased when the re-wettable coating of this invention is used on a glass tape instead of an SBR rubber based coating.

The data for the average load to first crack (KN) is located below in Table 1.

TABLE 1

| | Average Load to First Crack (KN) ASTM-C474 (appendix)* | | | | |
|---|---|---|---|---|---|
| GLASS WEB TYPE | COATING FORMULATION | AVG. | STANDARD DEVIATION | % STANDARD DEVIATION | % INCREASE |
| leno weave | 1 | 0.99535 | 0.06660 | 6.69117 | 56.4 |
| leno weave | 2 | 1.04833 | 0.05500 | 5.24635 | 64.7 |
| knit fabric | 1 | 1.14533 | 0.04948 | 4.31990 | 33.8 |
| knit fabric | 2 | 1.16988 | 0.07084 | 6.05531 | 36.67 |
| plain weave | 1 | 1.1815 | 0.11113 | 9.40573 | 15.83 |
| plain weave | 2 | 1.30383 | 0.04717 | 3.61752 | 27.8 |
| light plain weave | 2 | 0.9719 | 0.03865 | 3.97723 | 52 |
| control light plain weave | SBR | 0.63947 | 0.02935 | 4.59053 | |
| control woven leno | SBR | 0.63643 | 0.10435 | 16.39574 | |
| control plain weave | SBR | 1.02007 | 0.02424 | 2.37607 | |

TABLE 1-continued

Average Load to First Crack (KN) ASTM-C474 (appendix)*

| GLASS WEB TYPE | COATING FORMULATION | AVG. | STANDARD DEVIATION | % STANDARD DEVIATION | % INCREASE |
|---|---|---|---|---|---|
| paper tape control | N/A | 0.57779 | 0.06135 | 10.61801 | |
| control knit fabric | SBR | 0.85598 | 0.03834 | 4.47865 | |

*Current testing method allows samples to bend out of testing plane when test is in progress. Thus, 1st crack numbers may be false indication of tensile strength. Actual force at 1st crack may be higher when no bending or flexing occurs to initiate cracking.

Figure 4:
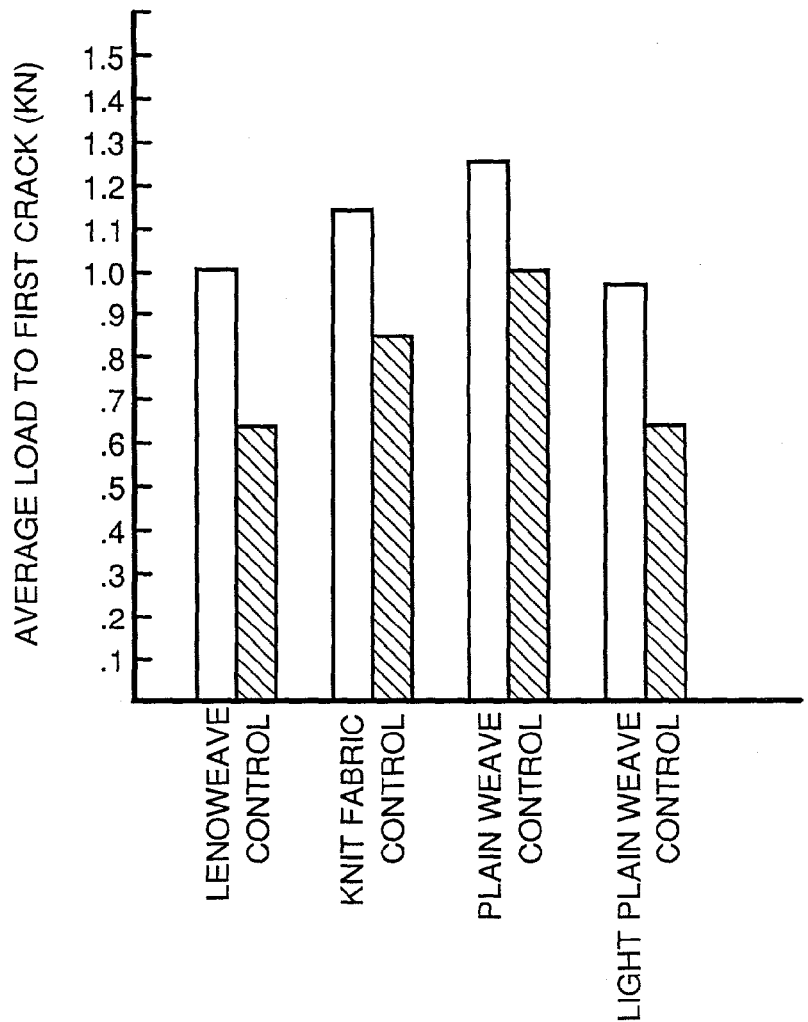
FIG. 4: is a graphical depiction of the average load to first crack for various drywall tape constructions, including those of the present invention.

This data is reflected in the bar chart of FIG. 4, using averages for Formulations 1 and 2 load reading when available. It was observed in these tests that there was at least about a 16% increase in average load to first crack using the rewettable coating of Formulations 1 and 2 over SBR coatings. Note that all samples were coated on one side with a pressure sensitive adhesive. It would be expected that the average load to first crack would be increased by a factor of two when no adhesive is applied to the back of equivalent samples. The explanation for this is that, in the case of the adhesive coated samples, half of the surface area of the glass web would be covered with a layer of low modulus pressure-sensitive material that does little to resist the loads placed on the sample.

It was additionally observed that, while standard products fail by fiber pull-out from the joint compound, the re-wettable coatings of this invention failed by delamination of the joint compound proximate to the coated fiber. Thus, the adhesive bond is stronger than the tensile strength of the dried or set compound. Although the tensile test is conducted on polyethylene blocks, where it is expected that the adhesion of the joint compound to the polyethylene would be poor, real drywall testing may demonstrate even better results.

From the foregoing it can be realized that this invention provides drywall joints and methods of joint fabrication which demonstrate improved tensile properties over kraft tape joints and over other glass tape joints employing rubber based or binder coatings. The tape constructions of this invention employ a re-wettable coating containing in the preferred embodiment a resinous binder which is at least partially soluble or dispersible in the aqueous mixture of most joint compounds. Although various embodiments have been illustrated, this was for the purpose of describing, but not limiting the invention. Various modifications, which will become apparent to one skilled in the art, are within the scope of this invention described in the attached claims.

What is claimed:

1. A drywall joint comprising:
   a seam region formed by drywall;
   a drywall tape covering said seam region, said drywall tape comprising a web of high strength fibers having a resinous coating thereon, wherein said resinous coating faces toward a water containing joint compound and is soluble therein, and wherein said resinous coating forms an adhesive bond with said joint compound when dried;
   wherein said fibers are embedded in said joint compound, and said resinous coating is solubilized by said joint compound;
   wherein said joint compound is dried; and
   wherein an adhesive bond is formed by said resinous coating with said joint compound which resists pull out of said fibers from said joint compound.

2. The drywall joint of claim 1 wherein said resinous coating comprises one or more of the group selected from: polyvinyl alcohol, polyvinyl acetate, polystyrene, polyvinylchloride, polyacrylate, ethylene vinyl acetate co-polymer, vinyl-acrylic co-polymer, styrene butadiene, acrylic polymer, starch, protein glues, soy protein, animal glue, gelatin, vegetable-based glue, gum, mucilage, inorganic compound, cementitious material and copolymers and combinations thereof.

3. The drywall joint of claim 1 wherein said web of fibers comprises; a non-woven fabric, woven fabric, knitted fabric, mat or scrim.

4. The drywall joint of claim 1 further comprising:
   a pressure sensitive adhesive on said drywall tape adhering said drywall tape to said drywall.

5. The drywall joint of claim 1 wherein said resinous coating comprises polyvinyl acetate and a water vapor resistant blocking agent dispersible when contacted with liquid water in the joint compound.

6. The drywall joint of claim 5 wherein said blocking agent comprises a waxy substance.

7. The drywall joint of claim 1 wherein a tensile strength of said adhesive bond is greater than a tensile strength of the joint compound itself.

8. The drywall joint of claim 1 wherein said drywall joint has an average load to first crack according to a test under industry specification ASTM C 474, which is at least 16% greater than that for a drywall joint without said resinous coating.

9. The drywall joint of claim 1, further comprising:
   a feathering portion of said joint compound.

10. A finished drywall seam region or repair region, comprising:
    an unfinished seam region or repair region formed by drywall;
    a drywall tape comprising a web of high strength fibers having thereon a resinous coating, wherein the resinous coating is separate from a water containing joint compound and, further wherein, the resinous coating is soluble in water, and faces toward a water containing joint compound and forms an adhesive bond with the water containing joint compound when dried;
    wherein said fibers are embedded in said water containing joint compound, and said resinous coating is solublized by said water containing joint compound;
    wherein said resinous coating is dried, together with the water containing joint compound; and wherein an adhesive bond is formed by said resinous coating with said joint compound which resists pull out of said fibers from said joint compound.

11. The finished drywall seam or repair region of claim 10, wherein said resinous coating comprises polyvinyl acetate and wax as a blocking agent.

12. The finished drywall seam region or repair region of claim 10 further comprising: a pressure-sensitive adhesive on said web to adhere said drywall tape to the drywall.

13. The finished drywall seam region or repair region of claim 10 wherein said resinous coating comprises one or more of the group selected from: polyvinyl alcohol, polyvinyl acetate, polystyrene, polyvinylchloride, polyacrylate, ethylene vinyl acetate co-polymer, vinyl-acrylic co-polymer, styrene butadiene, acrylic polymer, starch, protein glues, soy protein, animal glue, gelatin, vegetable-based glue, gum, mucilage, inorganic compound, cementitious material and copolymers and combinations thereof.

14. The finished drywall seam region or repair region of claim 10 wherein said web of fibers comprises; a non-woven fabric, woven fabric, knitted fabric, mat or scrim.

15. The finished drywall seam region or repair region of claim 10 further comprising: a pressure sensitive adhesive on said drywall tape to adhere said drywall tape to said drywall.

16. The finished drywall seam region or repair region of claim 10 wherein said resinous coating comprises polyvinyl acetate and a water vapor resistant blocking agent dispersible when contacted with liquid water in the water containing joint compound.

17. The finished drywall seam region or repair region of claim 16 wherein said blocking agent comprises wax.

18. The finished drywall seam region or repair region of claim 10 wherein a tensile strength of said adhesive bond is greater than that of the joint compound itself.

19. A method of making a drywall joint comprising:
   applying a water containing joint compound to embed a drywall tape covering a seam region formed by drywall;
   said drywall tape comprising, a web of high strength fibers having thereon a resinous coating facing toward said water containing joint compound, wherein said resinous coating and said fibers are embedded in said water containing joint compound, and wherein said resinous coating is solublized by said water containing joint compound, to form an adhesive bond with said joint compound when dried; and
   drying said joint compound and said resinous coating to form an adhesive bond between said resinous coating and said joint compound resisting pull out of said fibers from said joint compound.

20. The method of claim 19 wherein said drywall joint has an average load to first crack according to a test under industry standard specification ASTM C 474, which is at least 16% greater than that for a drywall joint without said resinous coating.

21. The method of claim 19 further comprising:
   adhering said drywall tape to said drywall by a pressure sensitive adhesive, prior to applying the water containing joint compound to embed the drywall tape.

22. The method of claim 19, further comprising:
   applying a feathering portion of said joint compound.

23. The method of claim 19 wherein said resinous coating comprises one or more of the group selected from: polyvinyl alcohol, polyvinyl acetate, polystyrene, polyvinylchloride, polyacrylate, ethylene vinyl acetate co-polymer, vinyl-acrylic co-polymer, styrene butadiene, acrylic polymer, starch, protein glues, soy protein, animal glue, gelatin, vegetable-based glue, gum, mucilage, inorganic compound, cementitious material and copolymers and combinations thereof.

24. The method of claim 19 wherein said web of fibers comprises: a non-woven fabric, woven fabric, knitted fabric, mat, or scrim.

25. The method of claim 19 wherein said resinous coating comprises polyvinyl acetate and a vapor resistant blocking agent.

26. The method of claim 19 wherein a tensile strength of said adhesive bond is greater than a tensile strength of the joint compound itself.

* * * * *